(12) United States Patent
Diorio et al.

(10) Patent No.: US 8,063,740 B1
(45) Date of Patent: Nov. 22, 2011

(54) INTERFACING TO RFID READER UTILITY THAT CAUSES RFID TAGS TO REPLY USING CHANGED REPLY TIMING

(75) Inventors: Christopher J. Diorio, Shoreline, WA (US); Gregory T. Kavounas, Kirkland, WA (US); Arthur Gustav Enyedy, Kirkland, WA (US)

(73) Assignee: Impinj, Inc., Seattle, WA (US)

( * ) Notice: Subject to any disclaimer, the term of this patent is extended or adjusted under 35 U.S.C. 154(b) by 713 days.

(21) Appl. No.: 12/243,144

(22) Filed: Oct. 1, 2008

Related U.S. Application Data

(63) Continuation-in-part of application No. 12/034,397, filed on Feb. 20, 2008, now Pat. No. 7,946,027.

(51) Int. Cl.
  *G08B 21/00*  (2006.01)
(52) U.S. Cl. ............... 340/10.1; 340/10.2; 340/10.3; 340/572.1
(58) Field of Classification Search .................. None
  See application file for complete search history.

(56) References Cited

U.S. PATENT DOCUMENTS

| | | | |
|---|---|---|---|
| 5,390,360 A * | 2/1995 | Scop et al. ............ | 455/516 |
| 5,530,702 A * | 6/1996 | Palmer et al. ............ | 370/445 |
| 5,841,770 A * | 11/1998 | Snodgrass et al. ............ | 370/346 |
| 6,566,997 B1 * | 5/2003 | Bradin ............ | 340/10.2 |
| 2004/0046645 A1 | 3/2004 | Atkins et al. | |
| 2006/0143163 A1 | 6/2006 | Smith et al. | |
| 2006/0209781 A1 * | 9/2006 | Wood ............ | 370/347 |
| 2007/0075838 A1 | 4/2007 | Powell | |
| 2008/0111661 A1 | 5/2008 | Lin et al. | |

OTHER PUBLICATIONS

Specification for RFID Air Interface: *EPCTM Radio-Frequency Identity Protocols Class-1 Generation-2 UHF RFID Protocol for Communications at 860 MHz—960 MHz Version 1.1.0.* 2004-2006 EPCglobal, Inc. Dec. 17, 2005, 1-100.
"Smart Card Alliance Identity Council. Countless Smart Cards vs. EPC Gen 2 RFID Tags: Frequently Asked Questions", *Smart Card Alliance, 2006* Jul. 2006, 1-6.
Final Office Action U.S. Appl. No. 12/035,397 dated Feb. 23, 2011.
EPCglobal, Inc "Specification of RFID Air Interface—EPC Radio—Frequency Identity Protocols Class-1 Generation-2 UHF RFID Protocol for Communications at 860 MHz-960 MHz, Version 1.1.0." (a.k.a. "The Gen 2 Spec") EPCglobal Inc. Dec. 17, 2005, http://www. Dec. 17, 2005.

* cited by examiner

*Primary Examiner* — Jennifer Mehmood
*Assistant Examiner* — Mark Rushing
(74) *Attorney, Agent, or Firm* — Turk IP Law, LLC

(57) ABSTRACT

Interfacing is provided, to a utility of an RFID reader. The utility causes the RFID reader to instruct tags to reply using changed reply timing. The interfacing enables an agent to control the utility, for installing it, configuring it, enabling it, disabling it, or operating it. In a number of embodiments, the tag timing change is achieved by causing a custom timing command to be transmitted to a tag. In some embodiments, the changed reply timing alters the delay before a tag backscatters a reply.

20 Claims, 12 Drawing Sheets

*RFID READER SYSTEM COMPONENT METHODS*

*RFID SYSTEM*

*RFID TAG*

*RFID READER SYSTEM DETAIL*

*RFID READER SYSTEM CONFIGURATION WITH OPTIONAL LOCAL AND REMOTE COMPONENTS*

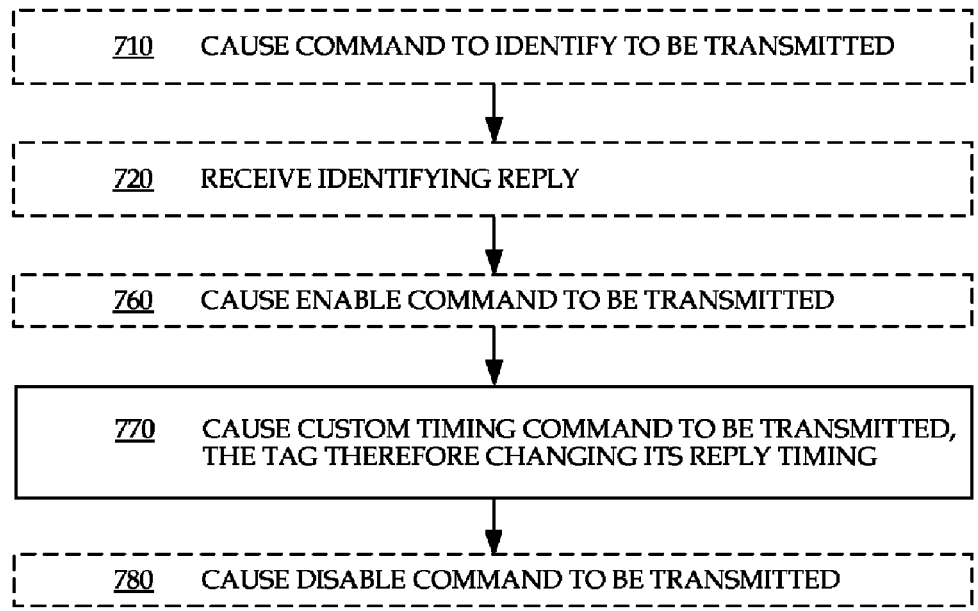
FIG. 7 — RFID READER SYSTEM COMPONENT METHODS
- 700
- 710 CAUSE COMMAND TO IDENTIFY TO BE TRANSMITTED
- 720 RECEIVE IDENTIFYING REPLY
- 760 CAUSE ENABLE COMMAND TO BE TRANSMITTED
- 770 CAUSE CUSTOM TIMING COMMAND TO BE TRANSMITTED, THE TAG THEREFORE CHANGING ITS REPLY TIMING
- 780 CAUSE DISABLE COMMAND TO BE TRANSMITTED
FIG. 8 — TRANSMITTED COMMANDS
812: 880 DISABLE, 870 CUSTOM TIMING, 860 ENABLE

| ITEM | COMMAND | TARGET | ACTION | MEMBANK | POINTER | LENGTH | MASK | TRUNCATE | CRC-16 |
|---|---|---|---|---|---|---|---|---|---|
| # OF BITS | 4 | 3 | 3 | 2 | EBV | 8 | VARIABLE | 1 | 16 |
| DESCR. | 1010 | 000: Inventoried (S0)<br>001: Inventoried (S1)<br>010: Inventoried (S2)<br>011: Inventoried (S3)<br>100: SL<br>101: RFU<br>110: RFU<br>111: RFU | See Table 6.18 | 00: RFU<br>01: EPC<br>10: TID<br>11: User | Starting Mask address | Mask length (bits) | Mask value | 0: Disable truncation<br>1: Enable truncation | |

*TABLE 6.17 - SELECT COMMAND OF THE GEN2 SPEC VERSION 1.1.0*

FIG. 9A

| | | | | Mask | | | FCF | |
|---|---|---|---|---|---|---|---|---|
| | Membank | Pointer | Length | FEF | | | Command code | Data |
| | | | | Subfield_1 | ... | Subfield_N | | |
| # of bits | 2 | EBV | 8 | Variable | Variable | Variable | 5 | Variable |
| description | – | – | – | – | – | – | – | – |

*SUBDIVIDING THE MASK FIELD*

FIG. 9B

| | | | | Mask | | | FCF | |
|---|---|---|---|---|---|---|---|---|
| | Membank | Pointer | Length | FEF | | | Command code | Data |
| | | | | Class ID | MDID | Indicator | | |
| # of bits | 2 | EBV | 8 | 2 | 12 | 1 | 5 | Variable |
| description | 10 | 06h | 14h | 10 | 000000000001 | 1 | 00000 | – |

*EXAMPLE*

FIG. 9C

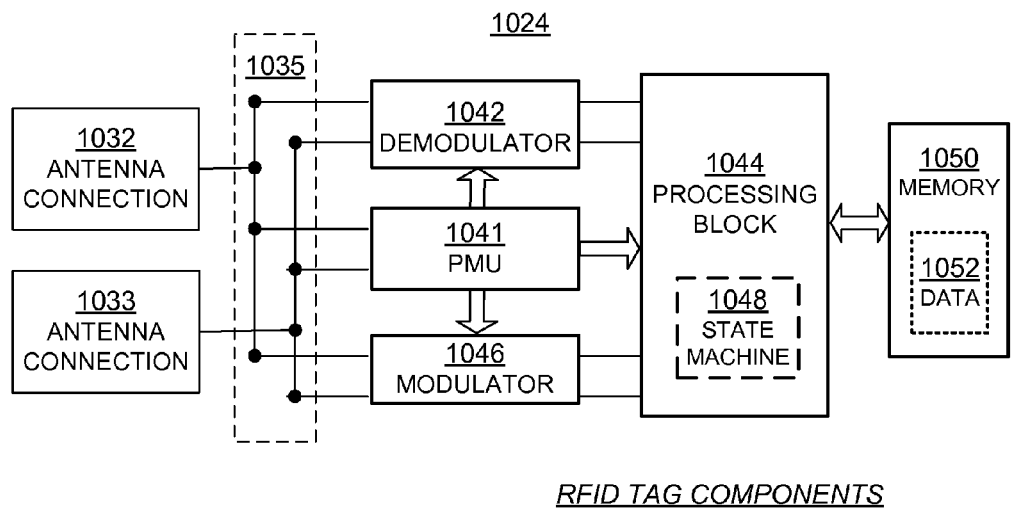
FIG. 10   *RFID TAG COMPONENTS*
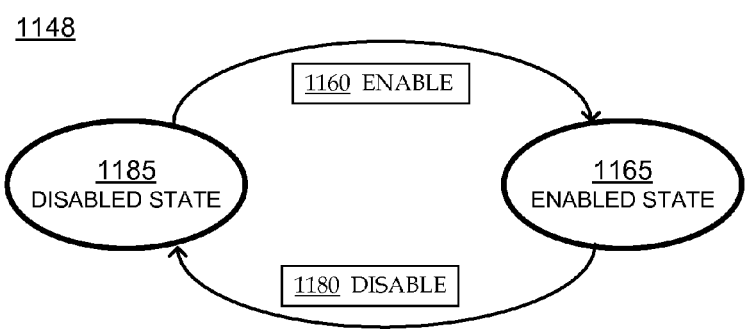
FIG. 11   *STATE DIAGRAM FOR CUSTOM FEATURE*

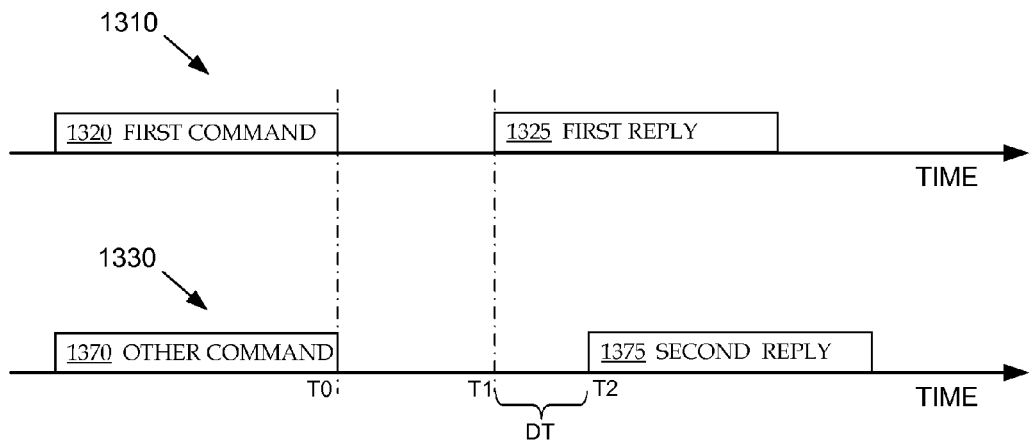
FIG. 13  *CHANGE REPLY TIMING*
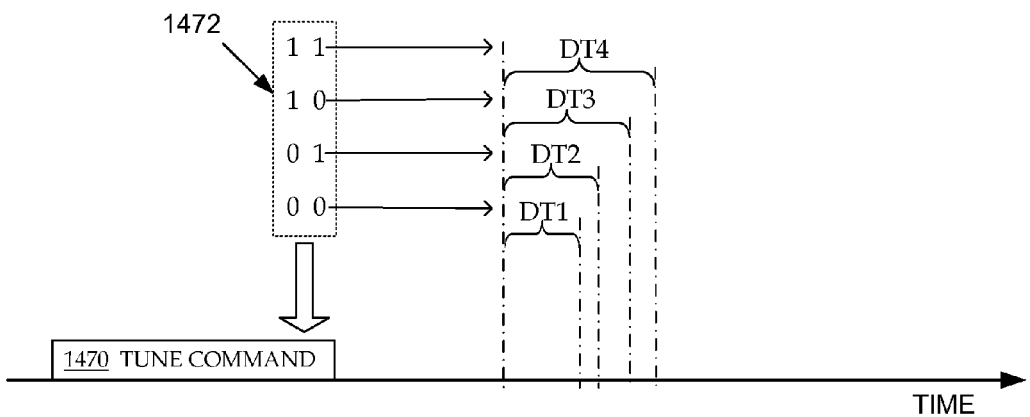
*TUNING DELAY OF REPLY TIMING*
FIG. 14

ARCHITECTURE OF INTERFACE CONVERTER
WITH AGENT AND UTILITY

SAMPLE SCREENSHOT OF INTERFACE
CONVERTER EXPOSING TO AGENT OPTIONS TO
CONTROL FUNCTIONALITY OF UTILITY

INTERFACING TO RFID READER UTILITY THAT CAUSES RFID TAGS TO REPLY USING CHANGED REPLY TIMING

CROSS REFERENCE TO RELATED APPLICATIONS

This application is a continuation-in-part (CIP) of co-pending U.S. patent application Ser. No. 12/034,397, filed Feb. 20, 2008 by the same inventors, entitled "CAUSING RFID TAGS TO REPLY USING CHANGED REPLY TIMING", commonly assigned herewith.

The parent case (Ser. No. 12/035,397) claims the benefit of U.S. Provisional Patent Application Ser. No. 60/902,745 filed on Feb. 21, 2007 and 61/005,232 filed on Dec. 4, 2007. The disclosures of both provisional patent applications are hereby incorporated by reference for all purposes.

Moreover, this application may be found to be related to U.S. patent application Ser. No. 12/035,393, filed Feb. 21, 2008 by the same inventors, entitled "RFID TAGS REPLYING USING CHANGED REPLY TIMING", commonly assigned herewith.

BACKGROUND

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways. In addition, tags usually have prescribed reply timings for replying by backscattering.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

It is desired to have RFID systems with additional capabilities, for improved functionality.

BRIEF SUMMARY

The invention improves over the prior art.

Briefly, the present invention provides interfacing to a utility of an RFID reader. The utility causes the RFID reader to instruct tags to reply using changed reply timing. The interfacing enables an agent to control the utility, for installing it, configuring it, enabling it, disabling it, or operating it. In a number of embodiments, the tag timing change is achieved by causing a custom timing command to be transmitted to a tag. In some embodiments, the changed reply timing alters the delay before a tag backscatters a reply.

The invention offers the advantage that some tags can be processed differentially from others, which can improve the functionality of a whole RFID system that processes RFID-tagged items. Additionally, the fact that the tags can actually perform the feature can serve as a verification criterion that the tags are not counterfeit. Moreover, some embodiments can enhance the privacy of the owners of items tagged with such tags.

BRIEF DESCRIPTION OF THE DRAWINGS

The following Detailed Description proceeds with reference to the accompanying Drawings, in which:

FIG. 7 is a flowchart illustrating methods for an RFID reader system component according to embodiments.

FIG. 8 is a diagram illustrating commands that may be transmitted as a result of operations of the flowchart of FIG. 7 according to embodiments.

FIG. 9A is a table illustrating the fields of the Select command of the Gen2 Spec version 1.1.0, versions of which may be used as any one or more of the commands of FIG. 8 according to embodiments.

FIG. 9B is a table illustrating how a number of custom commands can be enabled in a reader and a tag.

FIG. 9C is a table showing sample values that can be used for the table of FIG. 9B.

FIG. 10 is a block diagram of an implementation of an electrical circuit formed in an IC of the tag of FIG. 2.

FIG. 11 is an optional partial state diagram of a state machine of a tag having an electrical circuit as shown in FIG. 10.

FIG. 13 is two timing diagrams for illustrating how a reply timing can be changed according to some embodiments.

FIG. 14 is a conceptual timing diagram for illustrating how an amount of delay in the reply timings of the embodiments of FIG. 13 can be further tuned.

DETAILED DESCRIPTION

Figure 1:
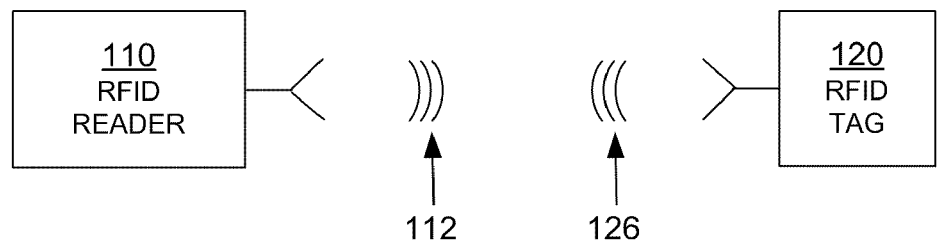
FIG. 1 is a block diagram of components of an RFID system.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment, an entirely firmware embodiment, or an embodiment combining aspects of the above. This description is, therefore, not to be taken in a limiting sense.

The invention is now described in more detail.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and demodulated from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e. having its own power source. Where tag 120 is a passive tag, it is powered from wave 112.

Figure 2:
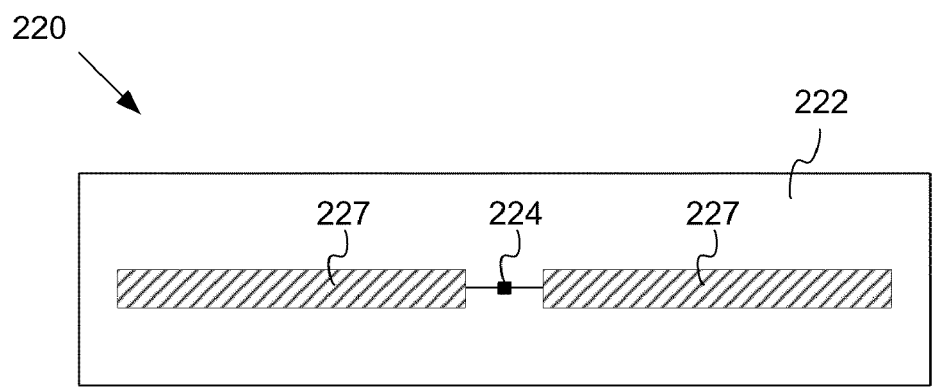
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
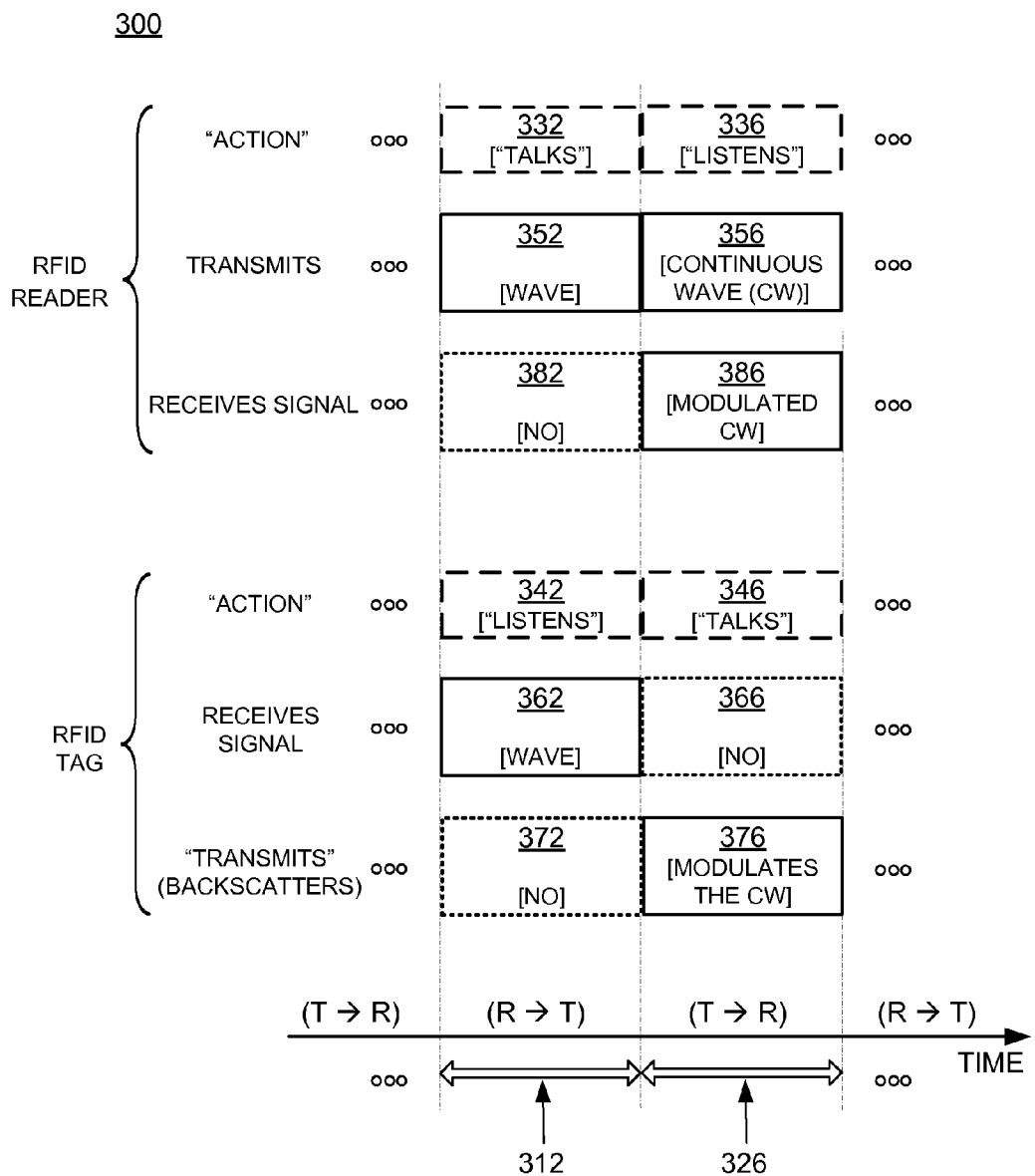
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326— here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are called protocols. A protocol is a specification that calls for specific manners of signaling between the reader and the tags.

One such protocol is called the Specification for RFID Air Interface—EPC™ Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO.

In addition, a protocol can be a variant of a stated specification such as the Gen2 Spec, for example including fewer or additional commands than the stated specification calls for, and so on. In such instances, additional commands are sometimes called custom commands.

Figure 4:
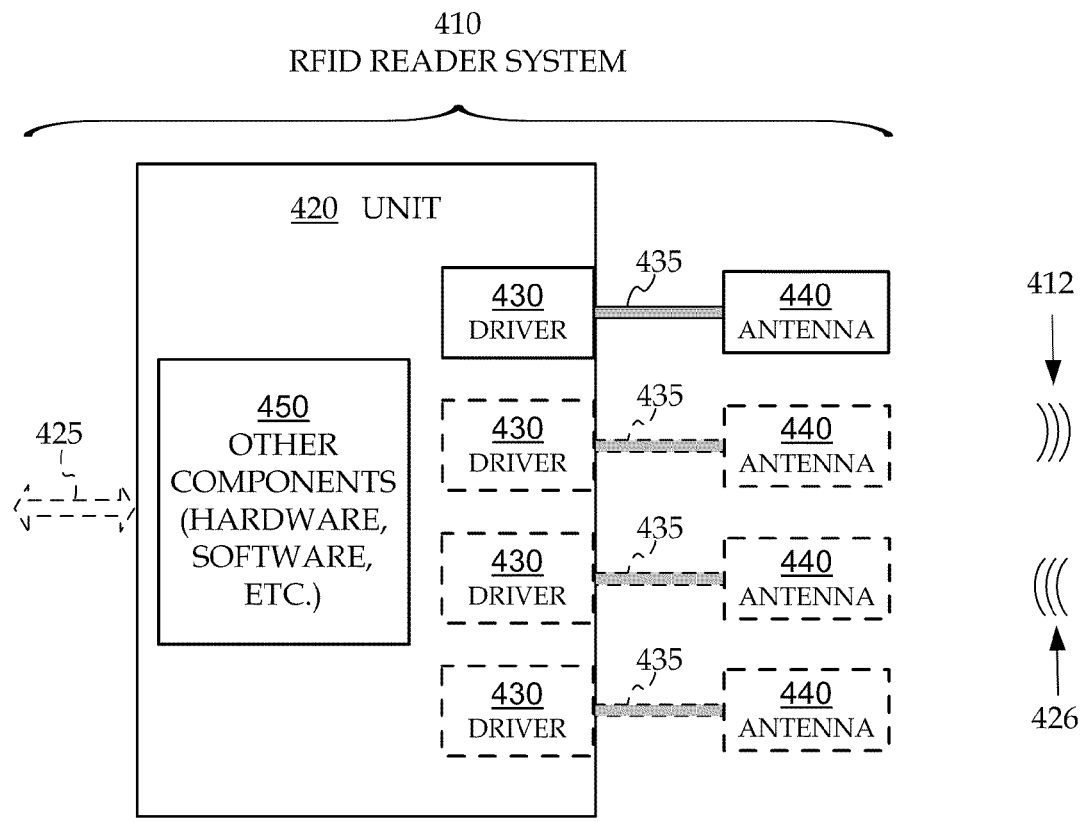
FIG. 4 is a block diagram showing a detail of an RFID reader system, such as the one shown in FIG. 1.

FIG. 4 is a block diagram showing a detail of an RFID reader system 410, which can be the same as reader 110 shown in FIG. 1. A unit 420 is also known as a box 420, and has at least one antenna driver 430. In some embodiments it has four drivers 430. For each driver 430 there is an output device for a connector. The output device is typically a coaxial cable plug. Accordingly connectors 435 can be attached to the output devices of the provided respective drivers 430, and then connectors 435 can be attached to respective antennas 440.

A driver 430 can send to its respective antenna 440 a driving signal that is in the RF range, which is why connector 435 is typically but not necessarily a coaxial cable. The driving signal causes the antenna 440 to transmit an RF wave 412, which is analogous to RF wave 112 of FIG. 1. In addition, RF wave 426 can be backscattered from the RFID tags, analogous to RF wave 126 of FIG. 1. Backscattered RF wave 426 then ultimately becomes a signal sensed by unit 420.

Unit 420 also has other components 450, such as hardware and/or software and/or firmware, which may be described in more detail later in this document. Components 450 control drivers 430, and as such cause RF wave 412 to be transmitted, and the sensed backscattered RF wave 426 to be interpreted. Optionally and preferably there is a communication link 425 to other equipment, such as computers and the like, for remote operation of system 410.

Figure 5:
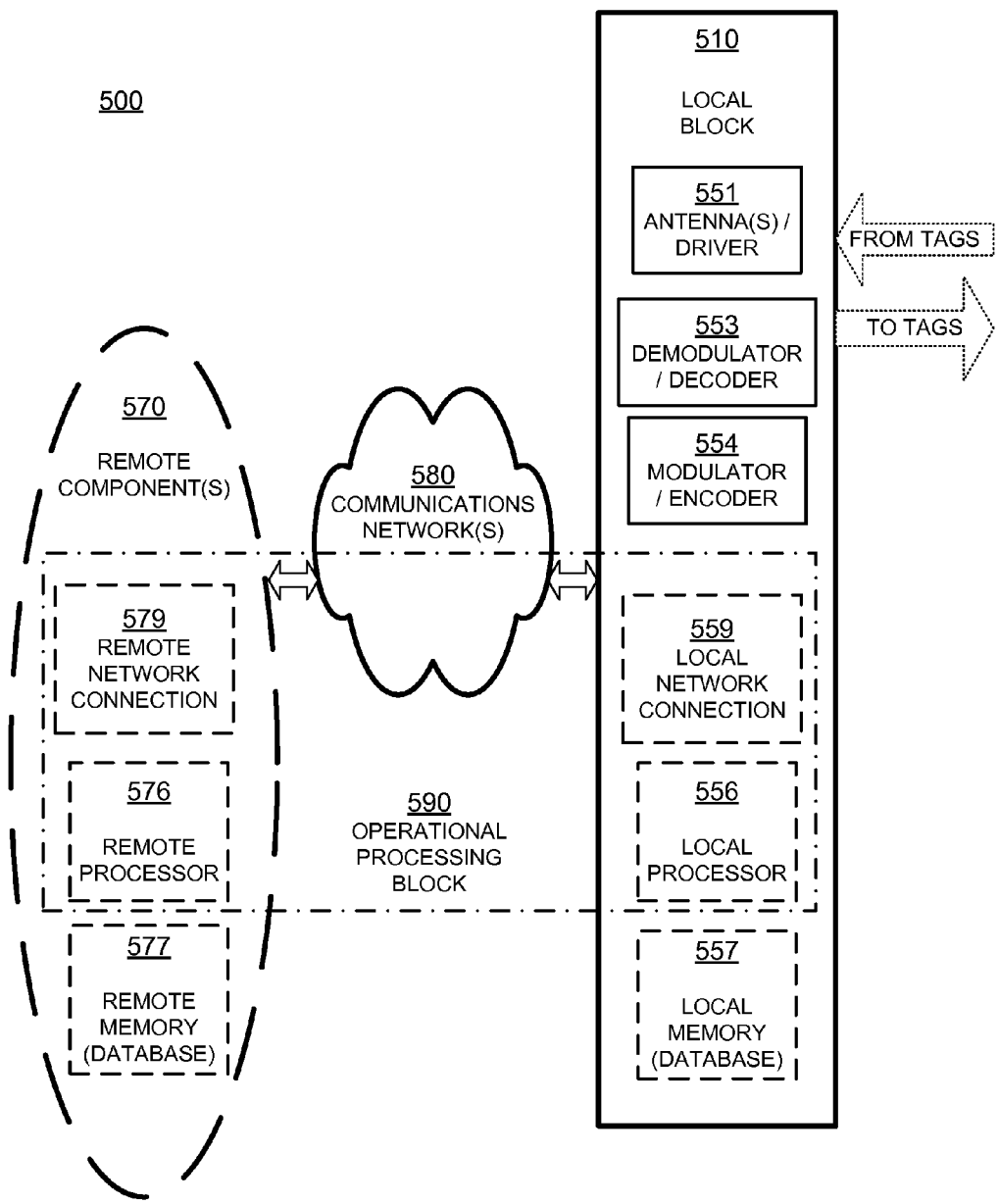
FIG. 5 is a block diagram of a whole RFID reader system according to embodiments.

FIG. 5 is a block diagram of a whole RFID reader system 500 according to embodiments. System 500 includes a local block 510, and optionally remote components 570. Local block 510 and remote components 570 can be implemented in any number of ways. It will be recognized that reader 110 of FIG. 1 is the same as local block 510, if remote components 570 are not provided. Alternately, reader 110 can be implemented instead by system 500, of which only the local block 510 is shown in FIG. 1. Plus, local block 510 can be unit 420 of FIG. 4.

Local block 510 is responsible for communicating with the tags. Local block 510 includes a block 551 of an antenna and a driver of the antenna for communicating with the tags. Some readers, like that shown in local block 510, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 553 demodulates and decodes backscattered waves received from the tags via antenna block 551. Modulator/encoder block 554 encodes and modulates an RF wave that is to be transmitted to the tags via antenna block 551.

Local block 510 additionally includes an optional local processor 556. Processor 556 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 553, the encoding function in block 554, or both, may be performed instead by processor 556.

Local block 510 additionally includes an optional local memory 557. Memory 557 may be implemented in any number of ways known in the art. Such ways include, by way of examples and not of limitation, nonvolatile memories (NVM), read-only memories (ROM), random access memories (RAM), any combination of one or more of these, and so on. Memory 557, if provided, can include programs for processor 556 to run, if provided.

In some embodiments, memory 557 stores data read from tags, or data to be written to tags, such as Electronic Product Codes (EPCs), Tag Identifiers (TIDs) and other data. Memory 557 can also include reference data that is to be compared to the EPC codes, instructions and/or rules for how to encode commands for the tags, modes for controlling antenna 551, and so on. In some of these embodiments, local memory 557 is provided as a database.

Some components of local block 510 typically treat the data as analog, such as the antenna/driver block 551. Other components such as memory 557 typically treat the data as digital. At some point there is a conversion between analog and digital. Based on where this conversion occurs, a whole reader may be characterized as "analog" or "digital", but most readers contain a mix of analog and digital functionality.

If remote components 570 are indeed provided, they are coupled to local block 510 via an electronic communications network 580. Network 580 can be a Local Area Network (LAN), a Metropolitan Area Network (MAN), a Wide Area Network (WAN), a network of networks such as the internet, or a mere local communication link, such as a USB, PCI, and so on. In turn, local block 510 then includes a local network connection 559 for communicating with network 580.

There can be one or more remote component(s) 570. If more than one, they can be located at the same location, or in different locations. They can access each other and local block 510 via network 580, or via other similar networks, and so on. Accordingly, remote component(s) 570 can use respective remote network connections. Only one such remote network connection 579 is shown, which is similar to local network connection 559, etc.

Remote component(s) 570 can also include a remote processor 576. Processor 576 can be made in any way known in the art, such as was described with reference to local processor 556.

Remote component(s) 570 can also include a remote memory 577. Memory 577 can be made in any way known in the art, such as was described with reference to local memory 557. Memory 577 may include a local database, and a different database of a Standards Organization, such as one that can reference EPCs.

Of the above-described elements, it is advantageous to consider a combination of these components, designated as operational processing block 590. Block 590 includes those that are provided of the following: local processor 556, remote processor 576, local network connection 559, remote network connection 579, and by extension an applicable portion of network 580 that links connection 559 with connection 579. The portion can be dynamically changeable, etc. In addition, block 590 can receive and decode RF waves received via antenna 551, and cause antenna 551 to transmit RF waves according to what it has processed.

Block 590 includes either local processor 556, or remote processor 576, or both. If both are provided, remote processor 576 can be made such that it operates in a way complementary with that of local processor 556. In fact, the two can cooperate. It will be appreciated that block 590, as defined this way, is in communication with both local memory 557 and remote memory 577, if both are present.

Accordingly, block 590 is location agnostic, in that its functions can be implemented either by local processor 556, or by remote processor 576, or by a combination of both. Some of these functions are preferably implemented by local processor 556, and some by remote processor 576. Block 590 accesses local memory 557, or remote memory 577, or both for storing and/or retrieving data.

Reader system 500 operates by block 590 generating communications for RFID tags. These communications are ultimately transmitted by antenna block 551, with modulator/encoder block 554 encoding and modulating the information on an RF wave. Then data is received from the tags via antenna block 551, demodulated and decoded by demodulator/decoder block 553, and processed by processing block 590.

The invention also includes methods. Some are methods of operation of an RFID reader or RFID reader system. Others are methods for controlling an RFID reader or RFID reader system.

These methods can be implemented in any number of ways, including the structures described in this document. One such way is by machine operations, of devices of the type described in this document.

Another optional way is for one or more of the individual operations of the methods to be performed in conjunction with one or more human operators performing some of them. These human operators need not be collocated with each other, but each can be only with a machine that performs a portion of the program.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described.

Figure 6:
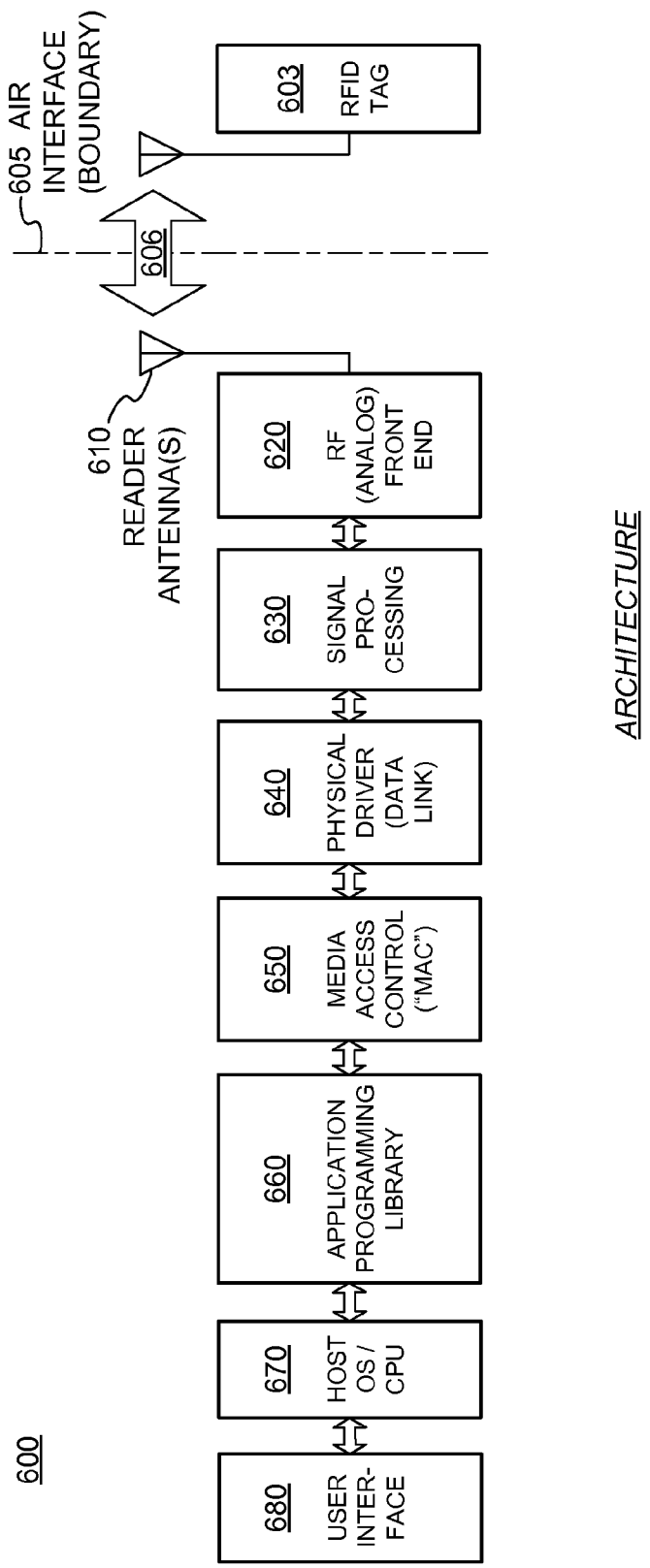
FIG. 6 is a block diagram illustrating an overall architecture of an RFID reader system according to embodiments.

FIG. 6 is a block diagram illustrating an overall architecture of an RFID system 600 according to embodiments. It will be appreciated that system 600 is considered subdivided into modules or components. Each of these modules may be implemented by itself, or in combination with others. In addition, some of them may be present more than once. Other embodiments may be equivalently subdivided into different modules. It will be recognized that some aspects are parallel with what was described previously.

An RFID tag 603 is considered here as a module by itself. Tag 603 conducts a wireless communication 606 with the remainder, via the air interface 605. It is noteworthy that air interface 605 is really only a boundary, in that signals or data that pass through it are not intended to be transformed from one thing to another. Specifications as to how readers and tags are to communicate with each other, for example the Gen2 Specification, also properly characterize that interface as a boundary.

RFID system 600 includes one or more antennas 610, and an RF Front End 620, for interfacing with antenna(s) 610.

These can be made as described above. In addition, Front End 620 typically includes analog components.

System 600 also includes a Signal Processing module 630. In this embodiment, module 630 exchanges waveforms with Front End 620, such as I and Q waveform pairs. In some embodiments, signal processing module 630 is implemented by itself in an FPGA.

System 600 also includes a Physical Driver module 640, which is also known as Data Link. In this embodiment, module 640 exchanges bits with module 630. Data Link 640 can be the stage associated with framing of data. In one embodiment, module 640 is implemented by a Digital Signal Processor.

System 600 additionally includes a Media Access Control module 650, which is also known as MAC layer. In this embodiment, module 650 exchanges packets of bits with module 640. MAC layer 650 can be the stage for making decisions for sharing the medium of wireless communication, which in this case is the air interface. Sharing can be between reader system 600 and tags, or between system 600 with another reader, or between tags, or a combination. In one embodiment, module 650 is implemented by a Digital Signal Processor. In some embodiments, many of the components of modules 620, 630, 640 and 650 can be implemented in one or two Integrated Circuit (IC) chips.

System 600 moreover includes an Application Programming Library module 660. This can include Application Programming Interfaces (APIs), other objects, etc.

All of these functionalities can be supported by one or more processors. One of these processors can be considered a host processor. Such a host processor might include a Host Operating System (OS) and/or Central Processing Unit (CPU) 670. In some embodiments, the processor is not considered as a separate module, but one that includes some of the above-mentioned modules of system 600.

A user interface 680 may be coupled to library 660, for accessing the APIs. User interface 680 can be manual, automatic, or both. It can be supported by the host processor mentioned above, or a separate processor, etc.

It will be observed that the modules of system 600 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 610 as signals, which are in turn processed successively by the various modules in the chain. Processing can terminate in any one of the modules. In a transmitting mode, initiation can be in any one of these modules. Ultimately, signals are routed internally, for antenna(s) 610 to transmit as wireless waves.

The architecture of system 600 is presented for purposes of explanation, and not of limitation. Its particular subdivision into modules need not be followed for creating embodiments according to the invention. Furthermore, the features of the invention can be performed either within a single one of the modules, or by a combination of them.

An economy is achieved in the present document in that a single set of flowcharts is used to describe methods in and of themselves, along with operations of hardware and/or software and/or firmware. This is regardless of how each element is implemented.

Methods are now described more particularly according to embodiments. Such methods may be practiced by different embodiments, including but not limited to RFID reader system components as described above. In addition, individual operations of such methods may be practiced by different readers, at different phases of the lifetime of an RFID tag, with or without interruptions between them, and so on.

In some embodiments, a first command is caused to be transmitted to the RFID tag. The first command is of course encoded in an electromagnetic wave such as wave 112, according to a communication protocol. Such protocols specify a number of such commands, and any such command can be considered to be the first command. Such commands can include, for example, command requesting a handle, such as a random number, or a more identifying number such as a TID or an EPC. A number of additional possible first commands are also described below in more detail, but that is only for example and not for limitation.

In some embodiments, a backscattered first reply is received from the tag, responsive to the first command having been transmitted. A reply to the first command can be considered as the first reply for purposes of this document. The first reply uses a first reply timing as the reply timing, and such tag reply timings are described in more detail later in this document.

The first command can be sent to a tag that has been singulated from a tag population. In other instances, the tag has not yet been singulated.

In one class of examples, the first command can be any of the commands issued in an exchange for commissioning a tag, where data is written in its memory, and an acknowledging reply is backscattered. It is known, therefore, that a tag that has been commissioned has received such a first command, and has replied to it.

FIG. 7 is flowchart 700 for illustrating some methods according to embodiments. In some embodiments, at optional operation 710 of FIG. 7, the first command is a command for the tag to identify itself to the reader. In some instances, operation 710 can be used for identifying the tag, and therefore knowing that it is capable of replying using a changed reply timing, as described in the present document. If operation 710 is not performed, however, the first command can be considered any other command in the exchange.

In some embodiments, at optional operation 720, an identifying reply is received as the first reply. These embodiments are preferably where the first command is operation 710. Again, if operation 720 is not performed, the first reply can be considered any other reply that a reader has done with a tag.

Operation 770 of flowchart 700 is now described. While the description of operation 770 is somewhat out of turn for the flow of flowchart 700, it is presented at this point in the document so that the description of the additional optional operations of flowchart 700 taking place before operation 770 will make sense.

At operation 770, a custom timing command is caused to be transmitted to the tag, after receiving the first reply. In response to receiving the custom timing command, when the tag later backscatters a second reply, that second reply uses a second reply timing that is different from the first reply timing. Again, examples of such second replies and such second reply timings are described in more detail later in this document.

It will be appreciated that operation 770 may be performed either by the same reader as the one that transmitted the first command, or by a different reader. In either case, the tag may or may not have lost power after backscattering the first reply, and before receiving the custom timing command. In embodiments where a reader processes a tag that has already been commissioned, operation 770 takes place. In addition, a first command may or may not have been transmitted. If it has been, then it may or may not be operation 710.

The custom timing command can be generated in any number of ways. For example, it can be automatic, or triggered by any number of events. Or an instruction can be received by one of the modules of FIG. 7, and be obeyed. In some embodiments, where operation 720 has taken place, the instruction can be generated and received responsive to parsing the identifying reply. In such instances, for example, it can be discerned from the identifying reply that the tag supports the custom timing command, and the instruction is thus generated. Then bits can be received, or looked up from a table stored in a memory, and so on. These bits can be prepared into one or more packets for transmission, and so forth.

In some embodiments, the tag is able to backscatter the second reply using the second reply timing regardless of what state it is in, at the time it receives the custom timing command of operation 770.

In other embodiments, the tag can have two states, namely an enabled state and a disabled state, as will be described in more detail later in this document. Briefly, if the tag is in the enabled state, it can operate as per the above. But if the tag is in the disabled state, if it were to receive the custom timing command, the second reply timing would not be different from the first reply timing, even if it backscattered the second reply.

In embodiments of the latter case, at an optional next operation 760, an Enable command can be caused to be transmitted while the tag is in the disabled state. In some instances, this would cause the tag to transition internally to the enabled state. In some instances, the Enable command can be the first command described above. In these cases, therefore, the second reply timing is different from the first reply timing responsive to receiving the custom timing command while the tag is in the enabled state.

An optional operation 780 can take place after operation 770. According to operation 780 a Disable command can be caused to be transmitted to the tag, while the tag is in the enabled state. This can cause the tag to transition internally to the disabled state.

FIG. 8 is a diagram illustrating commands that may be transmitted as a result of operations of the flowchart of FIG. 7 according to embodiments. A wave 812 is a special case of wave 112 of FIG. 1. An Enable command 860 is optionally sent first, according to operation 760. A custom timing command 870 is sent next, according to operation 770. Then a Disable command 880 is optionally sent, according to operation 780.

As will be realized, commands 860, 870, 880 can be configured in any number of ways. For example, if Enable command 860 is provided, it can be separate from custom timing command 870. Preferably, these are configured as separate standalone commands, each occurring at a single one of the communication sessions such as those of time interval 312 of FIG. 3. In addition, the tag need not backscatter a reply to any one of them individually.

In addition, command 870, plus optionally commands 860 and 880, may be used among other commands that will be transmitted to the tag in question, and possibly other tags. Equally, the optional first and second replies will be among other replies backscattered by the tag in question, and possibly other tags.

In some embodiments, a reader system component can perform a method according to flowchart 700 to communicate with a single tag. This can be accomplished if the tag is the only one in its field of view. Or, the tag in question can be within a population of tags, but it has been singulated. This means that the tag in question is the only one from the population that replies to the reader.

In other embodiments, a reader component can perform a method according to flowchart 700 to communicate with more than one tag. For example, custom timing command 870 can be transmitted to a population of tags, intending that they each backscatter a second reply using the second reply timing, either together, or at different times, or in response to subsequent commands.

In yet other embodiments, combinations are possible. For example, Enable command 860 might be sent to a population of tags before one of them is singulated. Then, custom timing command 870 might be sent to a tag that has been singulated, or to whole the population of tags.

Each one of commands 860, 870, 880 can be constructed in any number of ways. In some instances, they can be considered as custom commands as not being specified in a particular communication protocol. In some instances they would be standalone commands, made by a sequence of bits chosen so that they do not conflict with other commands of the protocol. In other instances, they can be commands with a custom payload. Such commands can be known to the protocol or not, and the payload can be used to distinguish among different custom commands, and optionally further transfer a parameter for the commands.

When commands are used that are known to the protocol, a section of their payload can be advantageously used for the purpose of implementing a custom command, such as commands 860, 870, 880. For example, it can be an enable payload, a disable payload, etc. Such a section in the payload can be a mask field, according to embodiments. For the Gen2 Spec, two such commands are the Select command and the BlockWrite command. Between these two candidate commands, it should be considered that the Select command can be transmitted before or after a tag is singulated out of its population, while the BlockWrite is better suited for singulated tags. In addition, the BlockWrite command is optional to the Gen2 Spec, and the tag would probably have to have a controller that can accept it.

Each one of commands 860, 870, 880 can thus be constructed as an implementation of this Select command or the BlockWrite command. In addition to responding to the payload implementing the custom command, the tag may further, or may not also respond to the underlying Select command or BlockWrite command. An example is now described in terms of the Select command, but would apply equally to the BlockWrite command.

FIG. 9A is a table illustrating the fields of the Select command of the Gen2 Spec. Version 1.1.0 of the Gen2 Spec is hereby incorporated by reference in its entirety. The fields of this Select command are explained in more detail in the above mentioned Gen2 Spec. In addition, the implementation of this Select command can have a custom payload so that it operates as Enable command 860, custom timing command 870, Disable command 880, and/or another custom command.

FIG. 9B is a table illustrating how a number of custom commands can be enabled in a reader and a tag. EBV stands for Extensible Bit Vector. The Mask Field can be partitioned as shown, into two primary subfields, named FEF and FCF.

The Feature Enabling Field (FEF) enables the tag to verify that it is a proper recipient for the command, by comparing the transmitted FEF value against a value in Membank. In this case, Membank can be EPC, TID or USER memory. As can be seen, the FEF can be further partitioned into subfields, for better clarity. Such subfields can include a Class Identifier, the MDID, and an Indicator Bit.

The Class Identifier can be two bits. For example, EPCglobal can correspond to a value of 10. This would allow the custom command to apply, for example, only to EPCglobal tags.

The MDID is the tag manufacturer's ID, which is stored in the tag's TID memory. For Impinj tags, this number is 000000000001 or 100000000001. The MDID allows a reader to select tags of only the manufacturer of interest. So, even if this Select command is transmitted and received before singulation, the Select command can select also according to the tag manufacturer's ID. This will cause the manufacturer's tags to be selected, and thus the reader can ensure prior knowledge of the tag manufacturer's identification.

The Indicator Bit can be set to 0 or 1. In the Gen2 spec, a tag model number follows the MDID. A bit of this model number can serve as the Indicator Bit, and can be interpreted as follows: If it is 0, the tags can interpret the command as an "ordinary" Select, and execute it per the Gen2 spec. Else, if it is 1, the tags can interpret the Select command as a custom instruction, and execute according to the FCF.

The Feature Command Field (FCF) can have a command code that indicates the number of the custom instruction. For example, a command code of 00000 could be the custom timing command. This permits 31 possible custom commands. In addition, a command code of 11111 could indicate an extended command code that extends into the subsequent data field.

The data field can contain data needed to implement the custom instruction, if any. Not all commands will use it. The data field can be variable in size. Its meaning will derive from the command codes.

In some embodiments, the tag may ignore the Target and Action field in the Select command, depending on whether these fields are relevant to the CI. In other embodiments, the tag may also set the appropriate flag.

In preferred embodiments, the entire Select command must be valid for the tag to accept and execute the custom command. That means valid values for Membank, Length, Pointer, Mask, CRC-16, etc. An example is now described.

FIG. 9C is a table showing sample values that can be used for the table of FIG. 9B. These could be used for a custom timing command. The Membank having a binary value of 10 point to the TID memory. The pointer having a hex value of 06 h points to the last two bits of the class identifier. The length having a hex value of 14 h points to a length of 20 bits that follow thereafter.

Everything described above in terms of readers and reader components finds some correspondence with tags and tag chips. In some instances, some of the above also describe features and behavior of tag chips.

FIG. 10 is a block diagram of an electrical circuit 1024 according to embodiments. Circuit 1024 may be formed in an IC of an RFID tag, such as IC 224 of FIG. 2. Circuit 1024 has a number of main components that are described in this document. Circuit 1024 may have a number of additional components from what is shown and described, or different components, depending on the exact implementation.

Circuit 1024 includes at least two antenna connections 1032, 1033, which are suitable for coupling to one or more antenna segments (not shown in FIG. 10). Antenna connections 1032, 1033 may be made in any suitable way, such as using pads and so on. In a number of embodiments more than two antenna connections are used, especially in embodiments where more antenna segments are used.

Circuit 1024 includes a section 1035. Section 1035 may be implemented as shown, for example as a group of nodes for proper routing of signals. In some embodiments, section 1035 may be implemented otherwise, for example to include a receive/transmit switch that can route a signal, and so on.

Circuit 1024 also includes a Power Management Unit (PMU) 1041. PMU 1041 may be implemented in any way known in the art, for harvesting raw RF power received via antenna connections 1032, 1033. In some embodiments, PMU 1041 includes at least one rectifier, and so on.

In operation, an RF wave received via antenna connections 1032, 1033 is received by PMU 1041, which in turn generates power for components of circuit 1024. This is true for either or both RT and TR sessions, whether or not the received RF wave is modulated.

Circuit 1024 additionally includes a demodulator 1042. Demodulator 1042 demodulates an RF signal received via antenna connections 1032, 1033. Demodulator 1042 may be implemented in any way known in the art, for example including an attenuator stage, an amplifier stage, and so on.

Circuit 1024 further includes a processing block 1044. Processing block 1044 receives the demodulated signal from demodulator 1042, and may perform operations. In addition, it may generate an output signal for transmission.

Processing block 1044 may be implemented in any way known in the art. For example, processing block 1044 may include a number of components, such as a processor, memory, a decoder, an encoder, and so on.

In a number of embodiments, processing block 1044 includes a state machine 1048. State machine 1048 retains the state of the tag, at least while circuit 1024 is powered. The state of the tag dictates which of the subsequently received commands the tag would respond to and how, and so on. State machine 1048 can be as is called for in the specified communications protocol, and adapted to further accommodate the custom timing command, with or without contradicting the operation of the protocol.

Circuit 1024 additionally includes a modulator 1046. Modulator 1046 modulates an output signal generated by processing block 1044. The modulated signal is transmitted by driving antenna connections 1032, 1033, and therefore driving the load presented by the coupled antenna segment or segments. Modulator 1046 may be implemented in any way known in the art, for example including a driver stage, amplifier stage, and so on.

In one embodiment, demodulator 1042 and modulator 1046 may be combined in a single transceiver circuit. In another embodiment, modulator 1046 may include a backscatter transmitter or an active transmitter. In yet other embodiments, demodulator 1042 and modulator 1046 are part of processing block 1044.

Circuit 1024 additionally includes a memory 1050, which stores data 1052. Memory 1050 is preferably implemented as a Nonvolatile Memory (NVM), which means that data 1052 is retained even when circuit 1024 does not have power, as is frequently the case for a passive RFID tag.

As already mentioned above, in some embodiments the custom timing command works only when the tag is in an enabled state, as opposed to a disabled state. An example is now described.

FIG. 11 is an optional partial state diagram 1148 of a state machine of a tag having an electrical circuit as shown in FIG. 10. State diagram 1148 can be implemented by state machine 1048. State diagram 1148 includes enabled state 1165, and disabled state 1185, which can be states as described above. In addition, an Enable command 1160 and a Disable command 1180 can be as described above. For example, the Enable command can cause the tag to transition to enabled state 1165. This can be either only from disabled state 1185, or by remaining there from enabled state 1165, and so on.

In some embodiments, enabled state 1165 and disabled state 1185 are provided in a way that does not define additional states in the underlying protocol. For example, for the Gen2 Spec, the initial Ready state can be a disabled state 1185, while one or more of the other states can be enabled states 1165. Or some of the other states can also be disabled state 1185.

In other embodiments, either one or both of enabled state 1165 and disabled state 1185 can be provided as states different from, and in addition to what is required by the Gen2 Spec. It should be remembered, however, that the invention may also be practiced with embodiments where the tag is always enabled to respond appropriately to the custom timing command by changing its reply timing, and has no disabled state.

Methods for RFID tags and tag chips are now described. These methods may be practiced by different embodiments, including but not limited to the tag embodiments described above. Such methods may be performed by a number of tags concurrently, or by a single tag, alone in a field of view or singulated from a population, as has already been described above. In addition, it will be recognized that such methods will be performed largely in response to reader methods, such as those of flowchart 700.

In some embodiments, a first command is received from an RFID reader. This would be the first command described above, as having been transmitted towards the tag.

Then a first reply is backscattered optionally by the tag responsive to receiving the first command. The first reply can be any reply specified by an applicable protocol for the first command. The first reply uses a first reply timing, which is typically a reply timing specified by the protocol, but can be any other reply timing.

Figure 12:
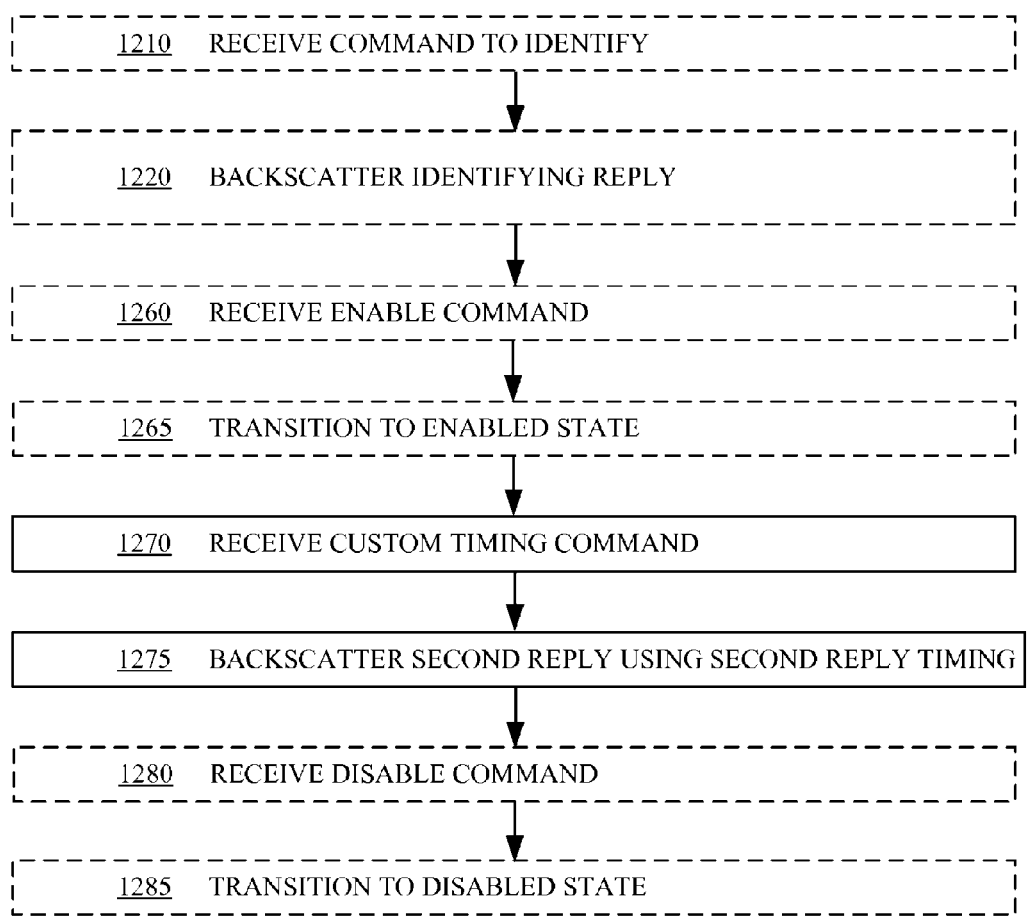
FIG. 12 is a flowchart illustrating methods for a tag according to embodiments.

FIG. 12 is flowchart 1200 illustrating sample methods for RFID tags according to embodiments. It will be recognized that a method according to flowchart 1200 will be performed largely in response to the method of flowchart 700 being performed.

According to optional operation 1210, a command to identify is received, which is the command caused to be transmitted at optional operation 710. In some embodiments, the command to identify can be considered to be the above-mentioned first command.

At optional operation 1220, an identifying reply is backscattered in response to the command, which is the reply received at operation 720. The identifying reply can be, for example, a random number, an Electronic Product Code (EPC), a TID, or other code stored in memory that identifies the tag or item it is attached to, or its capabilities to change its reply timing. In some embodiments, the identifying reply can be considered to be the above-mentioned first reply.

Operation 1270 of flowchart 1200 is now described. While the description of operation 1270 is somewhat out of turn for the flow of flowchart 1200, it is presented at this point in the document so that the description of the additional optional operations of flowchart 1200 taking place before operation 1270 will make sense.

At operation 1270, a custom timing command is received by the tag. The custom timing command is as described elsewhere in this document. Operation 1270 may be performed either at the same time as receiving the first command, or at a different time, e.g. by a different reader. For example, the first command may be received at a time that the tag is commissioned, while the custom timing command may be received months or years later. In such cases, the tag may have lost power after backscattering the first reply, and before receiving the custom timing command. In other instances, operation 1270 takes place during the same exchange as receiving the first command, without even losing power.

At a later operation 1275, the tag backscatters a second reply, which uses a second reply timing. The second reply timing is different from the first reply timing of the first reply, because the custom timing command has been received. This can be accomplished by the tag making appropriate internal adjustments, in operating its modulator. In addition, some of these adjustments may involve setting an internal flag, adjusting an internal state machine, and so on.

In some embodiments, the second reply is backscattered in response to receiving the custom timing command. In other embodiments, one or more intervening commands are received after the custom timing command, and the second reply is backscattered in response to receiving the one of these intervening commands.

In some embodiments, the reply timing is changed by the custom timing command only for the second reply, and the tag then reverts to using the first reply timing. In other embodiments, the reply timing is changed for more than one of the subsequent replies. For example, the tag could then receive a third command, and backscatter a third reply, with the third reply using a third reply timing different from the first reply timing. The third reply timing could be the same as or different than the second reply timing.

The effect of the custom timing command may or may not survive an interim loss of power, after the custom timing command is received. In some embodiments, the reply timing is changed permanently, while in others, if power is lost, the tag will reset to replying using the first reply timing.

As also mentioned above, in some embodiments, the tag is able to backscatter the second reply using the second reply timing regardless of what state it is in, at the time it receives the custom timing command according to operation 1270. In other optional embodiments, the tag can have two states, namely an enabled state and a disabled state, as described with reference to FIG. 11.

At optional operation 1260, the tag can receive an Enable command, such as the one transmitted at operation 760. At next operation 1265, the tag transitions internally to enabled state 1165. This can be done in preparation of operation 1270, when the custom command is received.

At optional operation 1280, the tag can receive a Disable command, such as the one transmitted at operation 780. At next operation 1285, the tag transitions internally back to disabled state 1185. This can be done after operation 1270, to cause the tag to revert to using the first reply timing in its further replies. The Disable command is not necessary to be implemented. For example, the tag could be automatically disabled after the second reply, or after a few replies, or upon reverting to another one of the specified states such as the Ready state of the Gen2 spec.

In addition, in the event that any of the received commands, such as the custom timing command, the Enable command, and the Disable command are implemented by the Select command of FIG. 9A, the tag can respond properly to it in addition to what is described with reference to the reply timings For example, the tag can set or unset an internal selected flag, and so on. Plus, the tag may or may not issue a reply, since the Select command does not call for a reply. But it might, in a custom embodiment.

The reply timing can be changed in many different ways, as will be evident to a person skilled in the art in view of the present description. In many such embodiments, the reply timing is a delay, before the tag starts backscattering, after receiving its most recent command, namely the command it is responding to. This works at least in the Gen2 Spec, which calls for the vast majority of tag replies to be received within a specified time window after finishing transmitting a command. Accordingly, readers may have a time window during which to receive tag replies. Changing the delay may thus cause the tag reply to fall outside the window of readers that do not know better, as would be unauthorized readers. As such, practicing embodiments of the invention could increase privacy. Examples are now given.

FIG. 13 shows two timing diagrams 1310, 1330, for describing how the reply timing can change according to embodiments. Diagram 1310 shows a first command 1320, which finishes being transmitted at time T0. Diagram 1310 also shows a first reply 1325, backscattered in response to first command 1310, and which starts being transmitted at time T1. First command 1320 and first reply 1325 can be the first command and the first reply described above. Here the first delay is a between times T0 and T1. The first reply can include a functional content as called for the exchange by the protocol, for example a code stored in a memory, a random number, and so on. Such a functional content is implemented by replies whose bits are specified by the applicable protocol. For example, these replies for the Gen2 Spec are PC, EPC, RN16, etc.

Diagram 1330 shows another command 1370, which finishes being transmitted at the same time T0, for comparison only with that of diagram 1310. Diagram 1330 also shows a second reply 1375, backscattered in response to other command 1370, and which starts being transmitted at time T2. The most recent command for second reply 1375 has thus been other command 1370, and thus second reply 1375 is has the second delay between times T0 and T2.

The reply timing has changed from diagram 1310 to diagram 1330, because the delay up to T2 is different than the delay up to T1, by an amount DT. It should be noted that, in this example, the delay up to T2 is longer than that up to T1, although that need not be the case. In fact, it could be the other way around. The changed reply timings can be used to enhance the privacy of using the tag, by making it harder to read by unauthorized readers.

Other command 1370 could be either the custom timing command, or a command that intervenes, being sent after the custom timing command. In fact, the custom timing command itself could call for no reply at all.

In addition, second reply 1375 encodes the same functional content as first reply 1325. In other words, second reply 1375 does the same function as first reply 1325, except that it is subject to a different delay. This can be accomplished in a number of ways. For example, second reply 1375 can be identical to first reply 1325, having the same bits. Or the bits can be substantially similar from what they would be, with only a few added or changed, for further preventing second reply 1375 from being read by unauthorized readers. Or the bits can be totally different, but still accomplish the same function.

FIG. 14 is a conceptual timing diagram for illustrating how an amount of delay DT in the reply timings of the embodiments of FIG. 13 can be further tuned according to embodiments.

A Tune command 1470 is caused to be transmitted by the reader, and received by the tag. Tune command 1470 can be any convenient command, such as the first command, the custom timing command, or other command in the communication. Tune command 1470 encodes a time-indicating parameter. The time indicating parameter can be encoded as data in the FCF subfield shown in FIG. 9B. The second reply timing is thus determined from the time-indicating parameter.

In an embodiment of a reader component, the time-indicating parameter can be looked up from a desired value for the second reply timing.

In the example of FIG. 14, the time-indicating parameter is a two-bit field code 1472. Here it is shown with the possible values it can take. Each value results in a different delay DT, namely one of DT1, DT2, DT3, and DT4. These values for delay DT can optionally be used in embodiments of the invention such as those of FIG. 13. The delay DT can be expressed in number of clock cycles, in a number of RF cycles, or in other units of time convenient for this purpose. Thus, in one example, delay DT can have values chosen among 4 msec, 8 msec, 12 msec, and 16 msec. In addition, such a delay should not be too long, because then other communication may start taking place.

The above described feature can be implemented by a so-called utility of an RFID reader. For example, a utility can include one or more of the above described components, operational processing blocks, an article of manufacture, etc. The invention further provides interfacing, to expose a functionality of this utility to an agent, as is described in more detail below.

Figure 15:
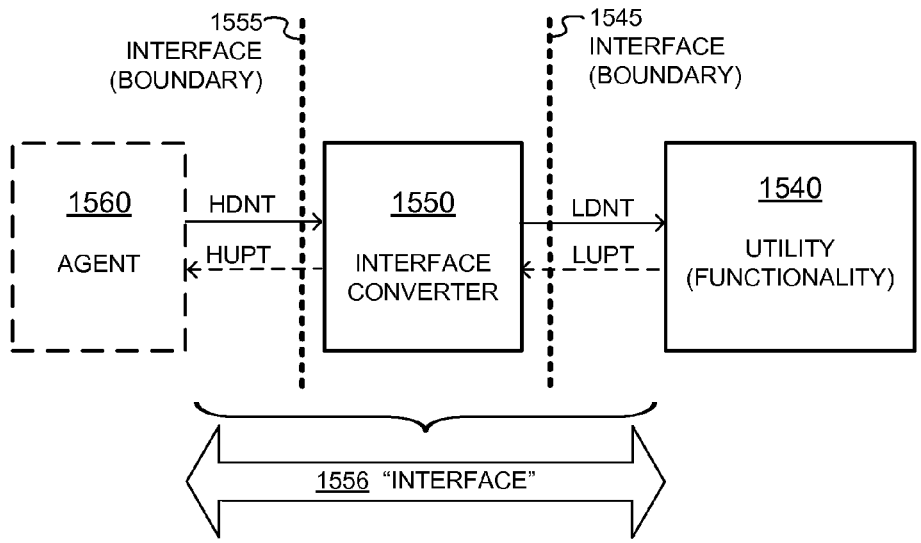
FIG. 15 is a block diagram illustrating an architecture for an interface converter according to embodiments.

FIG. 15 is a block diagram illustrating an architecture 1500 for an interface converter according to embodiments. Architecture 1500 includes a utility 1540, which is a mechanism for performing some or all of the reader features described above. More particularly, utility 1540 causes RFID tags to reply using changed reply timing, as per the above.

Architecture 1500 additionally includes an interface converter 1550, and an agent 1560. Agent 1560, interface converter 1550, and utility 1540 can be implemented in any way known in the art. For example, each can be implemented in hardware, middleware, firmware, software, or any combination thereof. In some embodiments, agent 1560 is a human.

The invention also includes embodiments of interface converter 1550, and methods of operation of an interface converter such as interface converter 1550. Interface converter 1550 thus enables agent 1560 to control utility 1540. Interface converter 1550 is so named because it performs a conversion, a change, as will be described in more detail below.

Between interface converter 1550 and agent 1560 and utility 1540 there are respective boundaries 1555, 1545. Boundaries 1555, 1545 are properly called interfaces, in that they are pure boundaries, as is the above described air interface.

In addition, it is a sometimes informal usage to call the space between boundaries 1555 and 1545, which includes interface converter 1550, an "interface" 1556. Further, it is common to designate this space with a double arrow as shown, with an understanding that operations take place within the arrow. So, while "interface" 1556 is located at a boundary between agent 1560 and utility 1540, it is not itself a pure boundary. Regardless, the usage of "interface" 1556 is so common for interface converter 1550 that this document sometimes also refers to it as an interface. It is clear that embodiments of such an "interface" 1556 can be included in this invention, if they include an interface converter that converts or alters one type of transmission or data to another, as will be seen below.

Agent 1560 can be one or more layers in an architecture. For example, agent 1560 can be something that a programmer programs to. In alternative embodiments, where agent 1560 is a human, interface converter 1550 can include a screen, a keyboard, etc. An example is now described.

Figure 16:
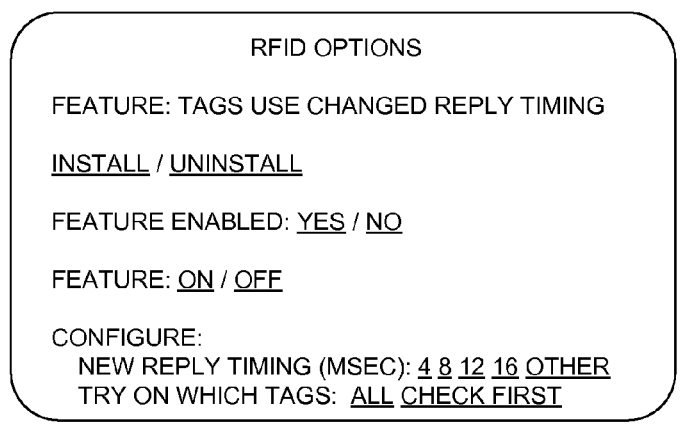
FIG. 16 is a sample screenshot of an interface converter such as the interface converter of FIG. 15, according to an embodiment.

FIG. 16 is a sample screenshot 1650 of an interface converter, such as the interface converter of FIG. 15. Screenshot 1650 can be that of a computer screen for a human agent, according to an embodiment. What is displayed in screenshot 1650 exposes the functionality of a utility, such as utility 1540. Inputs by the user via a keyboard, a mouse, etc., can ultimately control utility 1540. Accordingly, such inputs are received in the context of screenshot 1650. These inputs are determined from what is needed for controlling and operating utility 1540. An advantage with such interfacing is that agent 1560 can prepare RFID applications at a higher level, without needing to know how to control lower level RFID operations. Such lower level RFID operations can be as described in the Gen2 Spec, in other lower level protocols, etc.

Utility 1540 can be controlled in any number of ways. Some such ways are now described.

Returning to FIG. 15, interface converter 1550 can be implemented in any number of ways. One such way is as a software Application Programming Interface (API). This API can control or provide inputs to an underlying software library, and so on.

Transmissions can be made between agent 1560, interface converter 1550, and utility 1540. Such transmissions can be as input or can be converted, using appropriate protocols, etc. What is transmitted can encode commands, data, etc. Such transmissions can include any one or a combination of the following: a high down transmission HDNT from agent 1560 to interface converter 1550; a low down transmission LDNT from interface converter 1550 to utility 1540; a low up transmission LUPT from utility 1540 to interface converter 1550; and a high up transmission HUPT from interface converter 1550 to agent 1560. These transmissions can be spontaneous, or in response to another transmission, or in response to an input or an interrupt, etc.

Commands are more usually included in transmissions HDNT and LDNT, for ultimately controlling utility 1540. Controlling can be in a number of manners. One such manner can be to install utility 1540, or just a feature of it. Such installing can be by spawning, downloading, etc. Other such manners can be to configure, enable, disable, or operate utility 1540, or just a feature of it. These commands can be standalone, or carry parameters, such as data, etc. In some embodiments interface converter 1550 can convert these commands to a format suitable for utility 1540.

Data is more usually included in transmissions HUPT and LUPT. The data can inform as to success or failure of executing an operation. The data can also include tag data, which can be both codes read from tags, and data about reading tags, such as time stamps, date stamps, etc. In some embodiments interface converter 1550 can convert the data to a format suitable for agent 1560, including in some cases aggregating, filtering, merging, or otherwise altering the format or utility of the data.

It should be noted that, what passes across a single pure boundary can be unchanged, by the mere definition of what is a pure boundary. But what passes through interface converter 1550 can be changed or not. More particularly, high down transmission HDNT can be being encoded similarly to, or differently from, low down transmission LDNT. In addition, low up transmission LUPT can be being encoded similarly to, or differently from, high up transmission HUPT. When different, it can be attributed to interface converter 1550, which performs a suitable change, or conversion, of one transmission to another. The change, or conversion, performed by interface converter 1550 is for exposing the functionality of utility 1540 to agent 1560, and vice versa. In some embodiments, a command is converted, but a parameter is passed along without being converted. Plus, what is not converted at one module may be converted at another. Such modules taken together can also form an interface converter according to embodiments.

Figure 17:
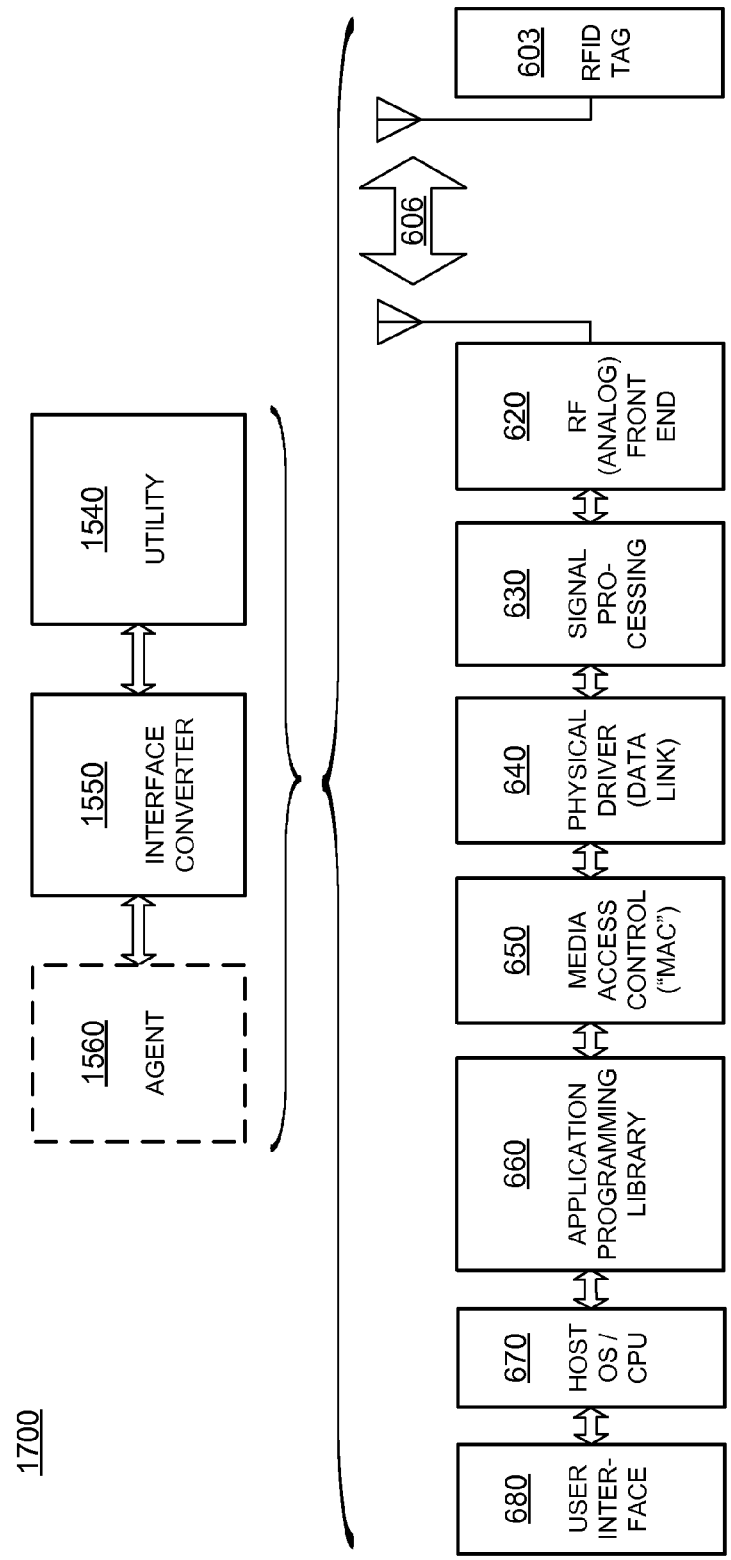
FIG. 17 is a diagram for showing a correspondence for how components of FIG. 15 can be implemented by those of FIG. 6, in embodiments where the interface converter is implemented by a reader.

Agent 1560, interface converter 1550, and utility 1540 can be implemented as part of a reader, or as a different device. For being implemented as part of a reader, FIG. 17 suggests a scheme 1700 where agent 1560, interface converter 1550, and utility 1540 can be implemented in connection with respective reader modules that are suitable, depending on the requirements.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. A method for an interface converter operable to control a utility of a Radio Frequency Identification (RFID) reader that can communicate with an RFID tag, the tag having received a first command, and backscattered a first reply responsive to the first command, the tag using a first delay before backscattering the first reply after receiving the first command, the utility operable to cause the RFID tag to reply using a changed reply timing by causing the reader to transmit to the tag a custom timing command, the tag then backscattering a second reply that encodes the same functional content as the first reply, the tag using a second delay before backscattering the second reply after receiving a most recent command prior to backscattering the second reply, the second delay different from the first delay responsive to receiving the custom timing command, the method comprising:

receiving a high down transmission to control the utility in a first manner; and responsive to the high down transmission, transmitting a low down transmission to control the utility in the first manner, the low down transmission being encoded differently than the high down transmission at least in part.

2. The method of claim 1, in which
the functional content is one of a code stored in a memory, and a random number.

3. The method of claim 1, in which
the first command is a command to identify,
the first reply is an identifying reply, and
in which the custom timing command is caused to be transmitted responsive to the identifying reply.

4. The method of claim 1, in which
the most recent command is one of a command to identify and the custom timing command.

5. The method of claim 1, in which
a Tune command is caused to be transmitted to the tag, which encodes a time-indicating parameter, and
the second delay is determined from the time-indicating parameter.

6. The method of claim 5, in which
the Tune command is one of the first command and the custom timing command.

7. The method of claim 1, in which
the utility is implemented as part of one of the RFID reader and a device other than the RFID reader.

8. The method of claim 1, in which
the first manner includes at least one from a set of: installing, enabling, disabling, configuring, and operating the utility.

9. The method of claim 1, in which
the high down transmission includes a time parameter, and
the second delay is controlled from the time parameter.

10. The method of claim 1, in which
a low up transmission is received responsive to transmitting the low down transmission, and
responsive to receiving to the low up transmission, a high up transmission is transmitted.

11. An interface converter operable to control a utility of a Radio Frequency Identification (RFID) reader that can communicate with an RFID tag, the tag having received a first command, and backscattered a first reply responsive to the first command, the tag using a first delay before backscattering the first reply after receiving the first command, the utility operable to cause the RFID tag to reply using a changed reply timing by causing the reader to transmit to the tag a custom timing command, the tag then backscattering a second reply that encodes the same functional content as the first reply, the tag using a second delay before backscattering the second reply after receiving a most recent command prior to backscattering the second reply, the second delay different from the first delay responsive to receiving the custom timing command, the interface converter configured to:
 receive a high down transmission to control the utility in a first manner; and
 responsive to the high down transmission, transmit a low down transmission to control the utility in the first manner, the low down transmission being encoded differently than the high down transmission at least in part.

12. The interface converter of claim 11, in which the functional content is one of a code stored in a memory, and a random number.

13. The interface converter of claim 11, in which
the first command is a command to identify,
the first reply is an identifying reply, and
in which the custom timing command is caused to be transmitted responsive to the identifying reply.

14. The interface converter of claim 11, in which
the most recent command is one of a command to identify and the custom timing command.

15. The interface converter of claim 11, in which
a Tune command is caused to be transmitted to the tag, which encodes a time-indicating parameter, and
the second delay is determined from the time-indicating parameter.

16. The interface converter of claim 15, in which
the Tune command is one of the first command and the custom timing command.

17. The interface converter of claim 11, in which
the utility is implemented as part of one of the RFID reader and a device other than the RFID reader.

18. The interface converter of claim 11, in which
the first manner includes at least one from a set of: installing, enabling, disabling, configuring, and operating the utility.

19. The interface converter of claim 11, in which
the high down transmission includes a time parameter, and
the second delay is controlled from the time parameter.

20. The interface converter of claim 11, in which
a low up transmission is received responsive to transmitting the low down transmission, and
responsive to receiving to the low up transmission, a high up transmission is transmitted.

* * * * *

UNITED STATES PATENT AND TRADEMARK OFFICE
CERTIFICATE OF CORRECTION

| | | |
|---|---|---|
| PATENT NO. | : 8,063,740 B1 | Page 1 of 1 |
| APPLICATION NO. | : 12/243144 | |
| DATED | : November 22, 2011 | |
| INVENTOR(S) | : Diorio et al. | |

It is certified that error appears in the above-identified patent and that said Letters Patent is hereby corrected as shown below:

1) After "timing" (column 10, line 57), please insert -- . --.

2) After "timings" (column 16, line 58), please insert -- . --.

Signed and Sealed this
Twenty-eighth Day of February, 2012

David J. Kappos
*Director of the United States Patent and Trademark Office*